United States Patent [19]

Leva

[11] Patent Number: 4,909,968

[45] Date of Patent: Mar. 20, 1990

[54] MASS TRANSFER TRAYS

[76] Inventor: Max Leva, 1 Hodgson Ave., Pittsburgh, Pa. 15205

[21] Appl. No.: 403,816

[22] Filed: Sep. 7, 1989

Related U.S. Application Data

[63] Continuation-in-part of Ser. No. 267,352, Nov. 4, 1988.

[51] Int. Cl.[4] .............................................. B01F 3/04
[52] U.S. Cl. .................................................. 261/113
[58] Field of Search ............................. 261/113, 114.2

[56] References Cited

U.S. PATENT DOCUMENTS

| | | | |
|---|---|---|---|
| 2,686,046 | 8/1954 | Green et al. | 261/114.2 |
| 2,893,713 | 7/1959 | Haltmeier | 261/114.2 |
| 3,075,752 | 1/1963 | Leva | 261/113 |
| 3,325,155 | 6/1967 | Bahout | 261/113 |
| 3,367,638 | 2/1968 | Leva | 261/113 |
| 3,421,335 | 1/1969 | Becker | 261/113 |
| 3,933,953 | 1/1976 | Leva | 261/113 |
| 4,171,333 | 10/1979 | Moore | 261/113 |
| 4,382,901 | 5/1984 | Thomas | 261/114.2 |

FOREIGN PATENT DOCUMENTS

| | | | |
|---|---|---|---|
| 387582 | 12/1923 | Fed. Rep. of Germany | 261/113 |
| 707769 | 7/1931 | France | 261/113 |

OTHER PUBLICATIONS

Corcoran, Corcoran Film Trays, Corcoran Co., Louisville, KY 40213.

*Primary Examiner*—Tim Miles
*Attorney, Agent, or Firm*—William J. Ruano

[57] ABSTRACT

A gas-liquid contact apparatus of the kind in which a plurality of substantially horizontal trays are arranged one above another in closely spaced relationship and intended to carry a relatively thin liquid film. Each tray is provided with a plurality of integral, downwardly extending chimneys that have been formed from the material of the tray itself. The chimneys, as viewed in vertical diametrical cross-section, blend into a substantially planar portion of the tray by an integral connecting portion having a radius of curvature in the range of substantially 0.75 millimeter to substantially 10 millimeters. The planar portion has a thickness in the substantially 0.25 millimeter to substantially 2.0 millimeters.

9 Claims, 2 Drawing Sheets

MASS TRANSFER TRAYS

This application is a continuation-in-part of application Ser. No. 07/267,352 filed Nov. 4, 1988.

This invention relates to new construction features of mass transfer trays that are primarily for use in distillation and related operations, where, generally speaking, low column irrigation rates are involved, and where column pressure drops and liquid hold-ups in the column must be low.

BACKGROUND OF THE INVENTION

In the conventional bubble cap, sieve and valve trays the gas-or vapor-liquid contact (henceforth only spoken of as vapor-liquid contact) is achieved by bubbling the vapor through a layer of liquid that may have a depth of several inches. These deep liquid layers, created and maintained on top of the trays, are wholly structure-related, and are therefore independent of the vapor flow. As distinct from these arrangements the type of mass transfer trays with which the invention is concerned are of such a construction, and operate in such a way that there is film flow instead, and no important liquid depth at all. Moreover a significant portion of the kinetic energy of the vapor is used to create the liquid film, and move it over the expanse of the tray. In so doing the vapor is brought into effective contact with this nascent film, and effective mass transfer is thereby achieved between the vapor and liquid, without the vapor having to penetrate a deep liquid layer. The trays of this type are fitted with downwardly depending chimneys.

The mechanism promoted by such trays has been presented in more detail in an initial publication of the inventor in the Trans, Inst. Chem. Engineers, Vol. 40, No. 2, pages 104–113, 1962. Other descriptions of such mass transfer trays are also given in U.S. Pat. Nos. 3,075,752 and 3,367,638, where various designs are discussed, with some emphasis on the choice of the shape of the depending chimneys. As will be noted the chimneys described in those specifications do in all instances represent distinctly separate entities, fitted and attached by various means to the horizontal tray deck itself.

SUMMARY OF THE INVENTION

It has now been found entirely unexpectedly and surprisingly that important improvements in the performance of such mass transfer trays can be achieved if the depending chimneys are cylindrical and embody certain geometrical features and dimensional ratios, that are most readily realized by forming the chimneys directly out of the material of the tray deck, as may be done for example by the method of extrusion.

According to the invention a mass transfer tray, for use in a multi-tray gas-liquid contact tower of the kind in which the trays are unobstructed and are arranged in closely spaced relationship and intended to carry a relatively thin liquid film, is provided with a plurality of integral downwardly extending cylindrical chimneys that have been formed directly from the material of the tray itself.

The performance improvements are particularly significant in regard to the greater mobility of the liquid film over the expanse of the trays and down to the trays below, much reduced liquid hold-up on the tops of the trays, and considerably lower vapor-phase pressure drops are encountered with the new chimney construction.

The invention will now be further described, by way of example only, with reference to the accompanying drawings in which:

DESCRIPTION OF THE PREFERRED EMBODIMENTS

Figure 1:
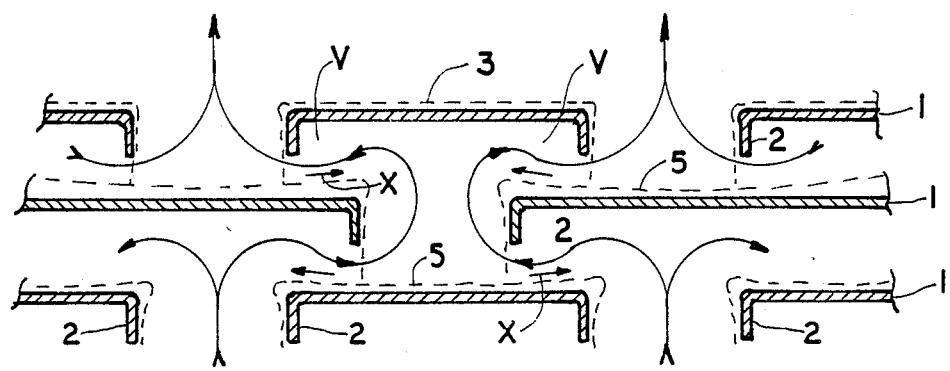
FIG. 1 is a schematic cross-section of part of a column showing portions of three trays, to show the flows which occur with columns of the type to which the invention relates.

The flow mechanism which occurs with trays of the type to which the invention relates is readily apparent from FIG. 1, where three mass transfer trays, identified by numeral 1, are shown. These are of flat unobstructed horizontal construction, fitted with downward extending short chimneys 2, that are, in regard to successive trays, laterally offset from each other. The trays are spaced fairly closely together, as is denoted by letter d. The entry of liquid 3 to the top of the uppermost tray is shown, as well as the entry of vapor 4 into the bottom tray. It will be noted that through the overall upward flow pattern of the vapor, and the division of the vapor flow into a multitude of horizontal velocity components, as denoted by V, the vapor is actually creating on the top of the tray a nascent liquid film 5, which leads to the aforementioned vapor-liquid contact at the boundary of this film, and to effective mass transfer between vapor and liquid.

Figure 2:
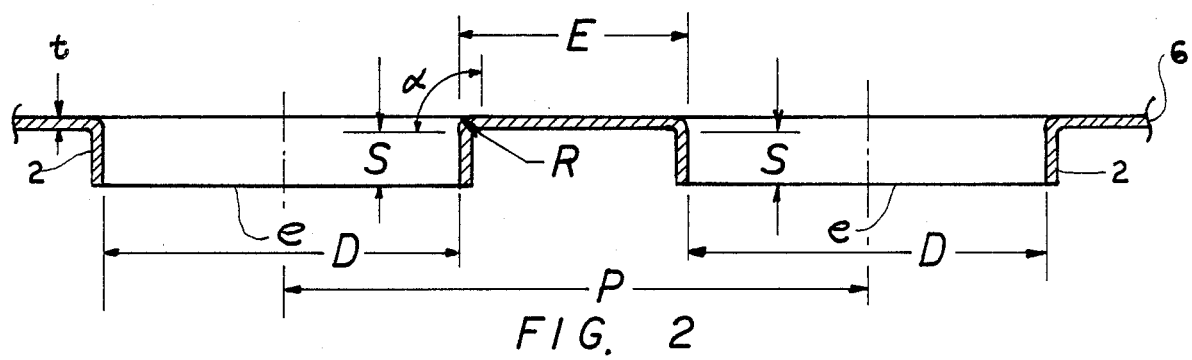
FIG. 2 is a vertical cross-section through two chimneys, showing details of the invention.

One embodiment of the new extruded cylindrical chimney-tray entity, all in accord with the present invention is presented in FIG. 2, where actually two immediately adjacent chimneys are shown. With reference to FIG. 2 the invention will now be described in greater detail. The horizontal plate material or tray deck, denoted by numeral 6 is seen to be free of any obstructions that may impede liquid flow over the surface area of the tray in any way. The thickness of the plate material is denoted by the letter t. It is of course important from the point of view of economics that the thickness t should be chosen as thin as is feasible. However in view of practical considerations of workmanship and serviceability it has been found that t will generally range from as low as 0.25 millimeter or occasionally less, to about 2.0 millimeters. For most operations the thickness t will however range from 0.40 to 1.5 millimeter.

Attention is now focused further on FIG. 2, which shows that the cylindrical chimneys comprise a straight section of skirt S, which extends vertically downwardly from the bent portion of the tray deck. It has now been found that provision of the correct length of these straight skirt sections is crucial for achieving optimum performance of the trays, as this is reflected by (a) providing an exceptionally high degree of operational stability (expressed as good performance over a wide range of vapor and liquid flow rates), (b) provision of the least fluid pressure drop in relation to mass transfer and (c) rendering the performance of the trays much less dependent on strictly horizontal installation into columns than is required with conventional trays. Although these beneficial results are already noted with relatively short straight skirts, the beneficial results generally improve with increasing skirt length, up to a certain point, beyond which the attending pressure drop through the chimneys will counteract and overshadow the mass transfer performance. Since for any particular application optimum results are also dependent on the choice of chimney diameter the critical effect of skirt length on optimum performance can be related to chimney diameter. Thus it has been found that for achieving optimum operational results the skirt length S should be no less than 0.05 D, nor more than 0.25 D where D is the inside diameter of the chimneys as shown in FIG. 2.

As already stated and as shown, FIG. 2 comprises two adjacent chimneys, extruded from the horizontal plate material, and extending downwardly. The distance between the centers of the chimneys, commonly referred to as the pitch, is denoted by letter P. The relative dimensional quantities embodied are typical. In extruding the chimneys 2 from the tray deck 6, the plate material of the tray deck is bent angularly downwardly, and the resulting bend is defined by the radius of curvature R and the angle $\alpha$ through which the curvature extends, all referred to the metal surface area on top of the tray deck and at the inside upper ending of the chimney. For most satisfactory operation it was found important to select as small a radius of curvature R in relation to the inter-chimney dimension E as is practical. This is obviously so because it is important to have the expanse E comprise as large a portion of flat plate material as possible, so as to accommodate formation and maintenance of the liquid film, and prevent its premature running off into the adjacent chimneys. In this way a high degree of efficiency, and operational stability of the trays are achieved.

On the other hand if the radius of curvature R becomes too small, resulting in a more or less sharp entry of the depending chimney 2 into the tray deck 6, the exit pressure loss of the vapor leaving the chimneys would become undesirably high. It is therefore important that for any one case of tray design the proper choice as to the magnitude of the radius of curvature must be made.

For practical purposes the acceptable dimensions of the radius of curvature are linked to the dimensions of the expanse E, and hence ultimately to the diameter of the chimneys. Thus within the limits of chimney diameters encountered with trays of the invention the attending radii of curvature will range from 0.75 millimeter to about 10 millimeters. However, for most applications the radii of curvature will be between 2 and 6 millimeters.

Since, as will become apparent from further description of the invention, namely that the depending chimneys 2 are substantially cylindrical along their major course, it follows that the angle $\alpha$ through which the curvature extends has substantially a value 90 degrees.

For efficient performance consideration must also be given to the selection of a suitable diameter for the cylindrical chimneys. Bearing in mind that the chimneys must facilitate simultaneous downward liquid flow and upward vapor flow (a situation which differentiates the present invention fundamentally from the functioning of bubble cap, sieve and valve trays, where in their intended operation the holes or openings should only carry vapor flow) it follows that the chimney diameters of the invention are in general much larger than the diameters (or equivalent diameters) found in the conventional trays. Thus in general, and for the entire useful spectrum of application of the present invention the smallest serviceable chimney diameters are about 10 millimeters, whereas the largest chimney diameters likely to be demanded are of the order of magnitude of 100 millimeters.

Figure 3:
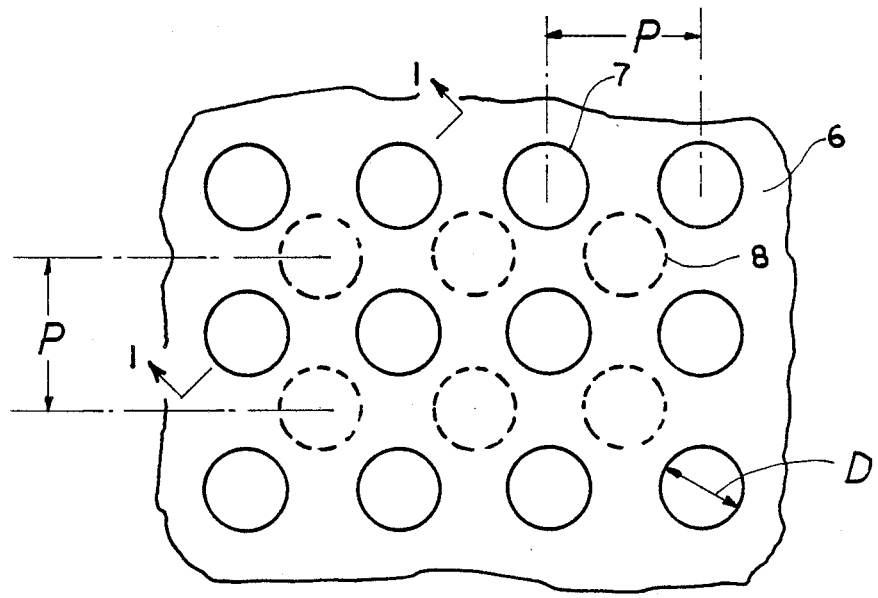
FIG. 3 is a plan view of a tray in the stack of FIG. 1.

As is apparent from FIG. 1, the trays are assembled in stacks, with the chimneys pointing downwardly and being alternately staggered in relation to each other. This staggered arrangement of the chimneys is also apparent from FIG. 3, where a portion of the trays is shown in plan view. Referring now in more detail to FIG. 3 the plate deck is designated by numeral (6) as before. The fully drawn circles, denoted by numeral (7) are the upper endings of the chimneys in the top tray, whereas the chimney location in the tray below is indicated by numeral (8). The chimneys in the trays are arranged in what is commonly known as a square pitch, with the pitch measured from chimney center to chimney center, and denoted by P, as already referred to in FIG. 2. With reference to defining the magnitude of the square pitch this is most conveniently done by relating it to the inside diameter D of the cylindrical chimney. Thus if related to the inside diameter it has been found that for best results the pitch P (square pitch) should not be larger than 2.50 D, nor less than 1.25 D.

Although in FIG. 3 the chimneys are shown in a square pitch, it is entirely within the spirit of the invention to define and use any other conceivable pitch in which the chimneys in the tray deck may be arranged.

It will be noted from FIG. 2 that the edges e of the cylindrical chimneys are entirely smooth and downward extending continuous. It is important that this be so in all instances, because if the chimney depths would be excessive to the point that the edges e would be jagged, additional non-rewarding flow resistance would be offered to the entering vapor streams, without any benefit of improved mass transfer. Besides jagged edges encourage corrosion, which lessens the life of the equipment.

Figure 4:
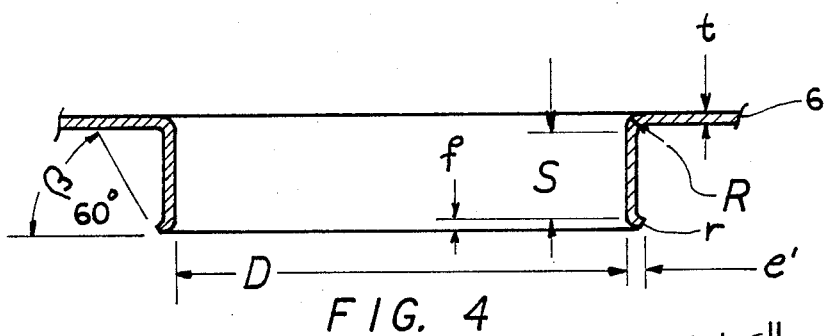
FIG. 4 is another vertical cross-section of a chimney showing additional invention details.

Consideration shall now be given to FIG. 4, which shows another version of a cylindrical chimney. The proper radius of curvature R, as well as the straight skirt length S are provided. Differing from the chimneys of FIG. 2 however the lower edge of the chimney of FIG. 4 has been slightly expanded and rolled outwardly. The surprising result achieved by this simple modification is that an appreciable saving in vapor phase pressure drop results, without an significant reduction in mass transfer. Pressure drop savings with bell-shaped conduits, in which the expanded diameter of the bell-shaped conduit end is appreciably larger than the main diameter of the conduit, are of course well known. However, since mass transfer performance in conduits decreases markedly as their diameters increase the amount of mass transfer achieved with such bell-shaped conduits is very much reduced, to the point that generally speaking bell-shaped conduits cannot be economically justified. The modified lower edge of FIG. 4, identified by letter r, can of course not be equated with bell-shaped conduits, since, as is apparent from FIG. 4, the extent of outward extensions e shown by rim r is clearly only of the order of magnitude of the thickness of the wall that forms the chimney. Furthermore the downward extending length f of the rim r represents only a minor portion of the entire chimney, the effective length of which is clearly defined by the length of straight skirt S, which is substantially larger than the downward extending length f of the modified edge r. Thus it is obvious that by turning the edge of the chimney upward, as shown in FIG. 4, only the effect of the edge on the fluid pressure drop is involved and not the effect of a general expansion of the chimney circumference, as would be the case with a bell-shaped extension of the cylindrical chimney conduit.

From FIG. 4 it is seen that the lower rim r has been turned through an angle $\beta$, equal to 60 degrees. Taking into account the considerable ranges of ductilities of materials of construction used in the chimneys, the extent of the allowable turning angle $\beta$ may not be readily specified. Of course the extent to which the rim can be turned outwardly will be dependent on sheet thickness t, the chimney diameter D, as well as the overall chimney depth. Thus it is conceivable that in some cases the rim r may extend through an angle of 90 degrees. However in most cases an angle of 60 degrees, as shown, or substantially less, would be serviceable.

Reference will now once more by made to FIG. 1, in regard to the liquid film 5. As stated already this liquid film is actually the result of the horizontal velocity components, which are imposed on the vapor flow, as a consequence of the chimney layout and their staggered arrangement in successive trays.

Considering the thus generated liquid film in greater detail it is noted that it is not of the same depth or thickness all across the tray, but becomes thicker as the liquid is driven from below an upper chimney to the mouth of a lower chimney, as is indicated by arrows X in FIG. 1.

This, indicated qualitatively in FIG. 1 is of course due to the relatively high exit velocity of the vapor from the chimney below, into which the liquid must flow. However low liquid depths are desirable, as thereby the liquid hold-up is kept low and the films are thin, offering great mobility and giving rise to high mass transfer efficiency.

With these considerations in mind the trays of the invention may be provided with special liquid relief ports, as are described in FIGS. 5 to 12 of the invention.

Figure 5:
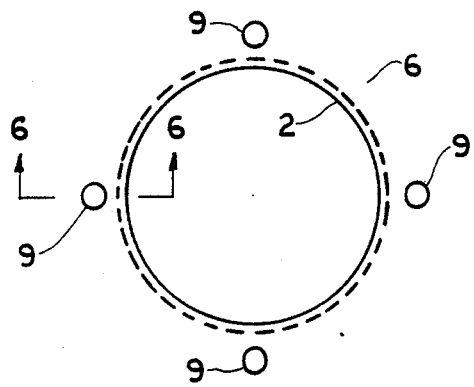
FIG. 5 is a plan view of the upper end of a chimney, surrounded by liquid relief parts.

Considering now FIG. 5, the wall of the chimney is denoted by numeral 2 butting into plate deck 6. Circumferentially around the upper end of chimney 2, and within the plate deck 6, are four liquid relief ports 9. These liquid relief ports are circular and spaced concentrically near the mouth of chimney 2, where the greatest operational liquid depth would occur. Thus they would be instrumental of discharging a portion of the normally arriving liquid, downwardly, into the flow chamber below. Chimney 2 would thereby be relieved from having to carry an excessive liquid load.

Figure 6:
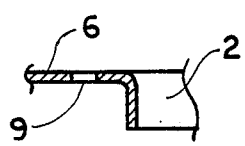
FIG. 6 is a partial sectional view of FIG. 5, along cut A—A.
Figure 8:
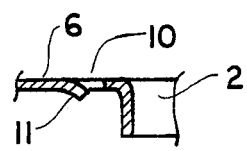
FIG. 8 is a partial sectional view of FIG. 7, along cut B—B.

FIG. 6 is a vertical elevation along cut A—A of FIG. 5, and shows the intended function of the liquid relief port in regard to the depending chimney. Since it is intended that only liquid will discharge downwardly through the liquid relief ports their dimensions must be chosen small enough to accomplish this. Normally this should demand effective diameter ranging from one to 5 millimeters. Since the film depths next to the chimney mouths are normally 1 to 2 millimeters thick, and since the vapor pressure drop through the chimneys is usually less than one millimeter of liquid column, there should be little danger in any event for any appreciable amounts of vapor to rise upward through the liquid relief ports, thus assuring their delivery of liquid only, downwardly.

Whereas the liquid relief ports shown in FIG. 5 are circular, and do not impart direction to flow of the liquid downwardly, it would of course be in the spirit of the invention to use other openings, such as elliptical, triangular openings, or any other direct-delivering openings.

The liquid relief ports shown in FIGS. 7 to 12, though fulfilling the same purpose as the circular liquid relief ports, namely to discharge a portion of the liquid from the high-crested film region downwardly, will in addition impart direction to the flowing liquid, as it is discharged downwardly. Specifically it is intended with these liquid relief ports to cause the discharged liquid to flow toward the outer surface area of the chimneys, to generate additional wetted area, useful for mass transfer, as well as prevent the downward flowing liquid to be picked up by the vapor, and thus not be entrained upwardly into and through the chimneys.

Figure 7:
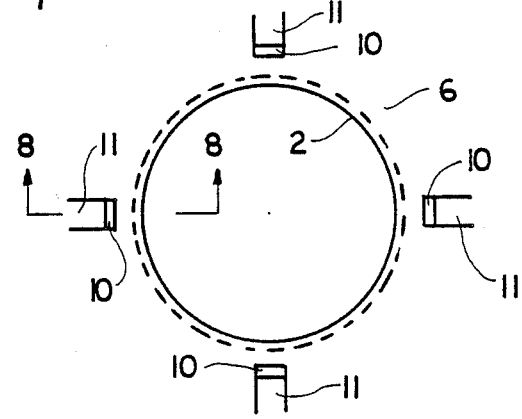
FIG. 7 is a plan view of the upper end of a chimney, surrounded by liquid relief ports of another design.

With these objectives in mind, FIG. 7 shows the wall of chimney, denoted by numeral 2, which abuts into plate deck 6. The liquid relief ports, arranged circumferentially, are denoted by numeral 10. These are essentially slotted openings that are generated by relatively narrow strips 11 in the tray deck, having been bent downwardly. This is readily apparent from FIG. 8, which is a vertical elevation through cut B—B of FIG. 7. Since the liquid on top of the tray will flow toward the chimney mouth, as is indicated by arrows X in FIG. 1, it is noted that downward oriented strip 11 will encourage the discharged liquid to be directed toward the outer surface areas of the chimneys, fulfilling the various functions as is indicated above.

Figure 9:
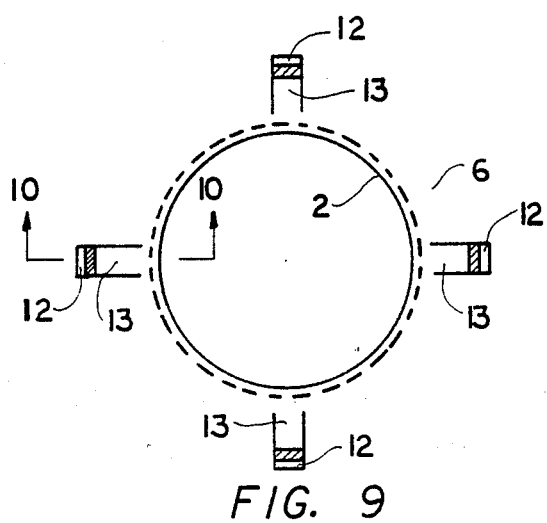
FIG. 9 is another plan view of the upper end of a chimney, surrounded by another design of liquid relief ports.
Figure 11:
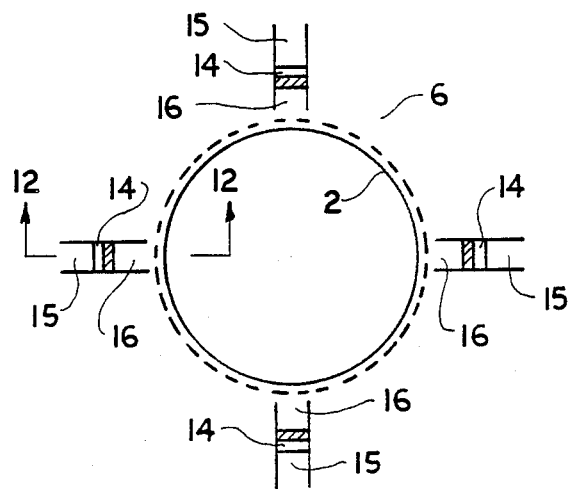
FIG. 11 is still another plan view of the upper end of a chimney, surrounded by still another design of a liquid relief port.
Figure 10:
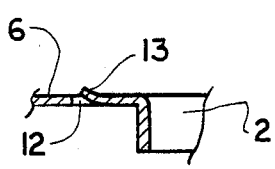
FIG. 10 is a partial sectional view of FIG. 9, along cut C—C.
Figure 12:
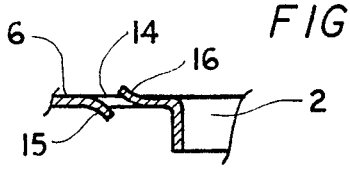
FIG. 12 is another partial sectional view of FIG. 11, along cut D—D.

Two other related designs of liquid relief ports, fulfilling the same functions as the liquid relief ports 10 just discussed, are shown in FIGS. 9 and 10, as well as FIGS. 11 and 12. The liquid relief ports in FIG. 9 are denoted by numeral 12 and have been generated by having bent the narrow strips 13 upwardly, all show sectionally in FIG. 10 along cut C—C in FIG. 9. Although the liquid is not encouraged to flow downwardly by a downward oriented strip, it will instead contact the underside of the raised strip 13 and will thus be directed toward the outside surface areas of the chimneys.

Finally, FIG. 11 shows another design of liquid relief port 14, with two deflected strips 15, being downwardly oriented and 16 being upwardly oriented. As may be seen from FIG. 12, which is a vertical elevation along cut D—D in FIG. 11 this design should be expected to work along the combined principles of the other two slotted liquid relief ports.

Although in FIGS. 5, 7, 9 and 11 four circumferentially located ports are shown, one may select a fewer number or more than the four shown, without being outside the scope of the invention.

While I have illustrated and described several embodiments of my invention, it will be understood that these are by way of illustration only an that various changes and modifications are contemplated in my invention within the scope of the following claims:

I claim:

1. A gas-liquid contact apparatus in which a plurality of substantially horizontal trays of small material thickness are arranged above each other in closely spaced relationship, intended to carry a relatively thin liquid film, in which each tray is provided with a plurality of vertically downwardly extending, substantially cylindrical chimneys, the upper ends of which are substantially within the plane of said horizontal tray, forming an integral part therewith through curved upper sections of said chimneys, each said cylindrical chimney comprising a substantially vertically downward extending cylindrical straight zone, the diameter of which is in the range from substantially 10 millimeters to substantially 100 millimeters, and the length of said cylindrical straight zone being not shorter than 0.05 nor longer than 0.25 of said diameter of said cylindrical straight zone.

2. Apparatus as claimed in claim 1, wherein said curved upper sections of said chimneys have a radius of curvature of 0.75 to 10 millimeters.

3. Apparatus as claimed in claim 2, wherein said radius of curvature is 1 to 6 millimeters.

4. Apparatus as claimed in claim 1, wherein said material thickness ranges from 0.25 to 2.0 millimeters.

5. Apparatus as claimed in claim 1, wherein each said vertical cylindrical straight zone terminates in a smooth continuous downwardly extending edge.

6. Apparatus as claimed in claim 5, wherein said vertical cylindrical straight zone continues integrally into an outwardly extending smooth, continuous edge.

7. Apparatus as claimed in claim 1, wherein the upper ends of said cylindrical chimneys are surrounded circumferentially by liquid relief ports.

8. Apparatus as claimed in claim 7, wherein said liquid relief ports are circular.

9. Apparatus as claimed in claim 7, wherein said liquid relief ports are comprised of slot and bent strip means.

* * * * *